United States Patent
Selby

(10) Patent No.: US 6,357,063 B1
(45) Date of Patent: Mar. 19, 2002

(54) PATIENT CARRIER DEVICE DOLLY

(76) Inventor: Daniel W. Selby, 905 Main St., Suite 315, Klamath Falls, OR (US) 97601

( * ) Notice: Subject to any disclaimer, the term of this patent is extended or adjusted under 35 U.S.C. 154(b) by 0 days.

(21) Appl. No.: 09/418,400

(22) Filed: Oct. 14, 1999

(51) Int. Cl.[7] ................................................ A61G 7/08
(52) U.S. Cl. .............................. 5/81.1 R; 5/626; 5/627; 5/628; 280/79.7; 280/47.131
(58) Field of Search ............................. 5/81.1 R, 625, 5/626, 627, 628; 296/20; 280/79.7, 47.131

(56) References Cited

U.S. PATENT DOCUMENTS

| | | | | |
|---|---|---|---|---|
| 2,919,138 A | * | 12/1959 | Brower et al. ................ | 280/35 |
| 4,369,982 A | * | 1/1983 | Hein et al. ................ | 296/20 X |
| 5,179,746 A | * | 1/1993 | Rogers ........................... | 5/625 |
| 5,233,708 A | * | 8/1993 | Winston, Sr. .............. | 5/81.1 R |
| 5,333,887 A | * | 8/1994 | Luther ....................... | 5/81.1 R |
| 5,871,220 A | * | 2/1999 | Lombard .................. | 5/625 X |
| 6,164,671 A | * | 12/2000 | Darling, III ............... | 5/627 X |

* cited by examiner

Primary Examiner—Lynne H. Browne
Assistant Examiner—James M Hewitt
(74) Attorney, Agent, or Firm—ipsolon llp

(57) ABSTRACT

A wheeled dolly assembly for a patient carrier device has a box frame with a foldable footrest. Interchangeable wheels are mounted to an axle to facilitate rapid and easy movement of the dolly when a patient is strapped onto the patient carrier. The patient carrier device, such as a backboard, is retained in the box frame with adjustable pressure plates. Optional handles are mounted to the backboard through slots pre-formed in the backboard.

18 Claims, 4 Drawing Sheets

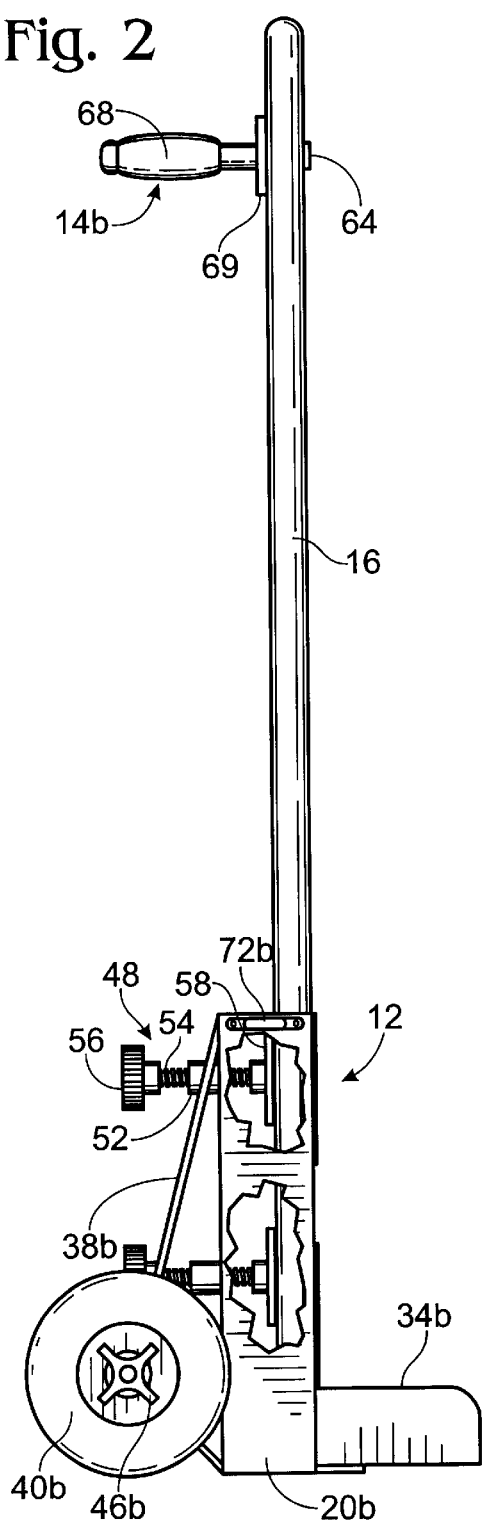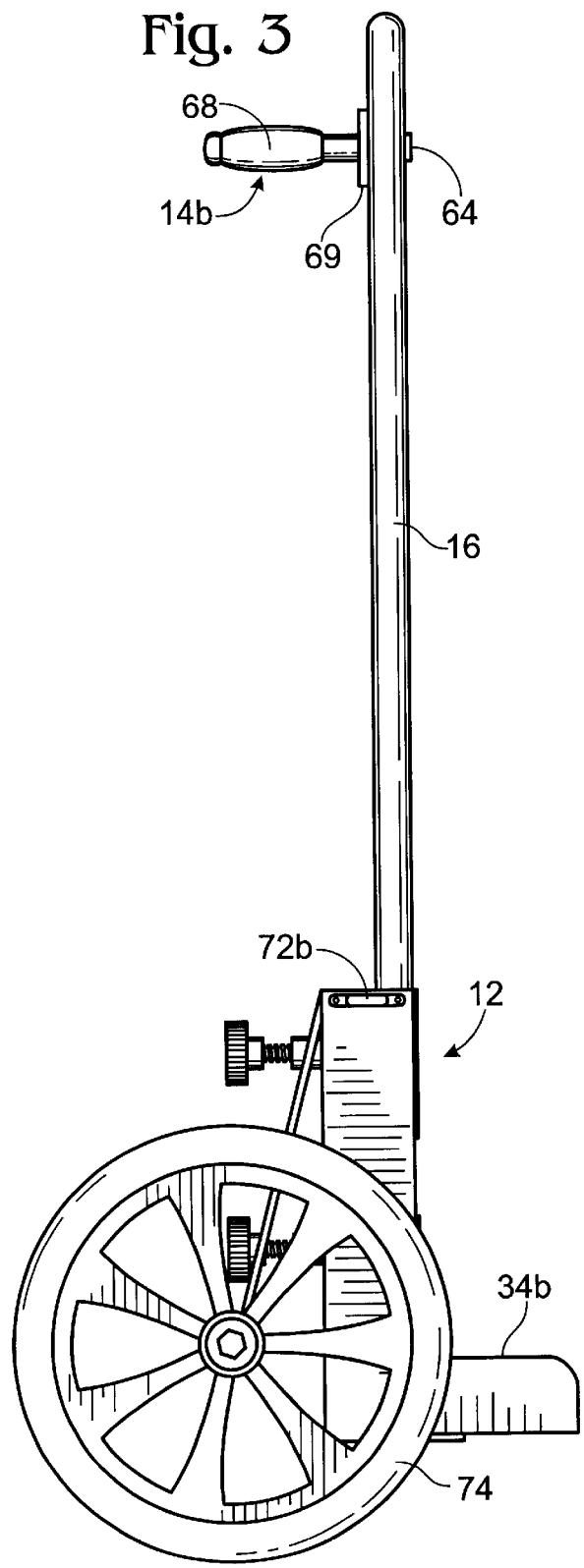

PATIENT CARRIER DEVICE DOLLY

FIELD OF THE INVENTION

This invention relates to patient carrier devices, and more specifically to a wheeled dolly for use with patient carrier devices such as backboards that are used in the evacuation of patients needing medical attention.

BACKKGROUND AND SUMMARY OF THE INVENTION

Paramedics and other emergency medical personnel routinely use patient carrier devices to evacuate injured patients. There are many different kinds of patient carriers, including numerous styles of backboards and extrication cots, and they are available from many commercial sources, in many different shapes and styles. Almost all such devices include a variety of straps that are used to secure the patient in place on a patient-carrying platform. With reference to a typical "backboard," in a typical emergency patient evacuation the injured patient is strapped to the platform defined by the backboard in a manner appropriate for the patient's particular medical condition. Often the patient is either not ambulatory or the patient's medical condition necessitates careful movement of the patient—hence the backboard serves as a platform on which the patient is immobilized while being transported to a remote location, for instance an ambulance or a triage location.

As a first step in patient evacuation, when a patient is ready to be moved the patient must be adequately immobilized on the backboard. This is typically accomplished with the patient in a supine position. In most cases at least four medical personnel are required to transport an injured patient secured to a backboard. In some cases more than four personnel are needed. One of the team is positioned at each of the four corners of the backboard. Each of the four personnel carefully lifts the backboard to raise the patient. The fully loaded backboard must then be carefully transported to a safe location. Transporting the patient often requires careful maneuvering. For instance, moving an injured patient through a typical house often presents difficult situations, such as maneuvering around tight corners, and going up or down stairs. This kind of maneuvering is difficult enough when transporting inanimate objects such as furniture. But when it is an injured patient that is being transported, the difficulties encountered in transporting the patient become far greater.

Other evacuation scenarios present even more difficult problems. To identify just a few of the difficult situations faced everyday by paramedics, consider the example of a victim who, because of his or her location in a dangerous or potentially dangerous situation, must be transported quite rapidly—the victim of a fire who is unable to move on their own is a good example. The need to move the victim quickly out of harm's way greatly compounds the difficulties faced by the paramedics. As another example, many automobile accidents involve "over the side" situations where in an accident the automobile has gone over an embankment. Often this occurs in difficult terrain. Getting an injured victim out of this kind of a precarious situation often mandates that a team of more than four personnel are needed to move the patient on the backboard. An over the side accident even often necessitates a system of ropes, pulleys and winches to pull the backboard up the embankment slope. When several paramedics are carrying the backboard it is easy to understand the difficulties the paramedics face in attempting to minimize patient disruption during even relatively simple evacuations.

Another graphic example is the situation where a victim is located in a bedroom having a narrow doorway, and/or a house having narrow hallways. Many structures existing today have narrow doorways and corridors. Transporting a patient through such restricted passages can be very difficult, especially where the patient's medical condition mandates extremely careful patient handling. When a backboard requires a team of four paramedics to carry the patient, maneuvering the backboard and the patient is very difficult.

As a final example of the difficulties emergency medical personnel encounter when transporting injured patients, it is of course obvious that extreme care must be taken to transport a patient having a potential spinal injury. Even in a relatively straightforward evacuation where no great obstacles are encountered, paramedics must exercise the utmost caution when transporting the patient. This can make the paramedic's job very difficult in even the most routine transportation of victims of spinal injuries. When the evacuation scenario is more difficult, as is often the case, the difficulties of the paramedics' job is compounded.

Patient transport is not the only function of patient carrier devices such as backboards. Often a victim is located remotely from the nearest vehicular access. This occurs, for instance, where a hiker or climber has been injured in a remote location that is not accessible to emergency vehicles. In that case, paramedics may need to carry emergency medical equipment such as jump bags, oxygen canisters and even cardiac monitoring equipment a long distance to the victim. Many paramedics use backboards as a platform onto which such equipment may be loaded and secured. Of course, more than one person is needed to carry a heavy load. But the backboard nonetheless provides a convenient method of transporting the equipment.

As may be derived from the discussion above, patient transport on patient carrier devices is often a difficult and dangerous operation. The difficulties encountered with even the most routine patient moves are compounded when the victim is located in a dangerous or restricted area, or where the patient's medical condition presents special concerns, for instance where the patient is unconscious and unable to assist in the move, or where the injury mandates special patient treatment. Nonetheless, patient carrier devices are used ubiquitously in the emergency medical field. Such devices are used everywhere from civilian medical evacuations to military evacuations—they are used wherever there is a need to transport the injured, and they make the paramedics' job much easier and the offer significant improvements in patient care.

But despite their everyday usefulness in securing injured patients and their role in transporting the patient, patient carrier devices ironically cause many problems, including injuries to both the patient and to the team of emergency personnel transporting the patient. For example, many, many emergency medical personnel are injured every year while patients are being transported on carrier devices. Back, shoulder and other injuries are common among paramedics caused by lifting patients who are secured to backboards. Sometimes the patients are simply so heavy that even a team of four paramedics has trouble lifting the patient, creating great lifting strain on the team members. These problems are compounded where the patient is in a difficult environment that necessitates lifting in other than ideal lifting positions, and when the patient must be moved in a low-angle evacuation.

Thus, there is a need for a patient carrier device system that is ergonomically designed to consider both the needs of the patients and the paramedics who transport them. As noted, in some situations the patient must be evacuated with haste. This is the case, for instance, in a tactical response type of emergency where it is necessary to get victims out of a dangerous situation very quickly. Standard carrier devices such as backboards make this job difficult, since at least four people are needed to carry the device when a patient is strapped to it. This also puts four medical personnel in a dangerous situation while the victim is being loaded onto the backboard and during transportation to a safe location.

Thus, there is a very real need for a patient carrier device that addresses the needs of both medical personnel and patients. The present invention addresses these needs by providing a wheeled dolly that is adapted for use with almost every patient carrier device available on the market today, from all types of backboards to extrication cot devices. The invention converts a standard carrier device such as a backboard into a rapid deployment and evacuation system for injury victims. The wheeled dolly has a box frame that accepts the carrier device and secures it into place in the box frame to thereby provide a two-wheeled platform on which to transport the victim. Handles are optionally provided with universal attachments for rapid connection with any backboard or carrier device. With the combination of the dolly and the optional handles, the patient carrier may be transported through even the most difficult locations and terrain. Moreover, the use of a wheeled dolly allows even heavy and/or severely injured patients to be reliably transported by fewer personnel than is required when the present invention is not employed. Various types of wheels may be mounted onto an axle to meet the needs of the varying conditions where victims may be located. With the appropriate wheels in place, the injured patient may be moved around corners and through doorways that would be all but impassible with the carrier device alone. Even heavy equipment may be strapped to the wheeled system and moved by a single paramedic. The risk of injuries to the paramedics—especially back and shoulder injuries—is greatly reduced since the dolly reduces the effective load weight that the paramedic must heft.

BRIEF DESCRIPTION OF THE DRAWINGS

FIG. 2 is a side elevational view of the embodiment of FIG. 1 with a portion of the box frame partially cut away to show the pressure pads.

FIG. 3 is a side view of an alternative embodiment of the present invention with an alternate, off-road wheel.

DETAILED DESCRIPTION OF PREFERRED EMBODIMENTS

Figure 1:
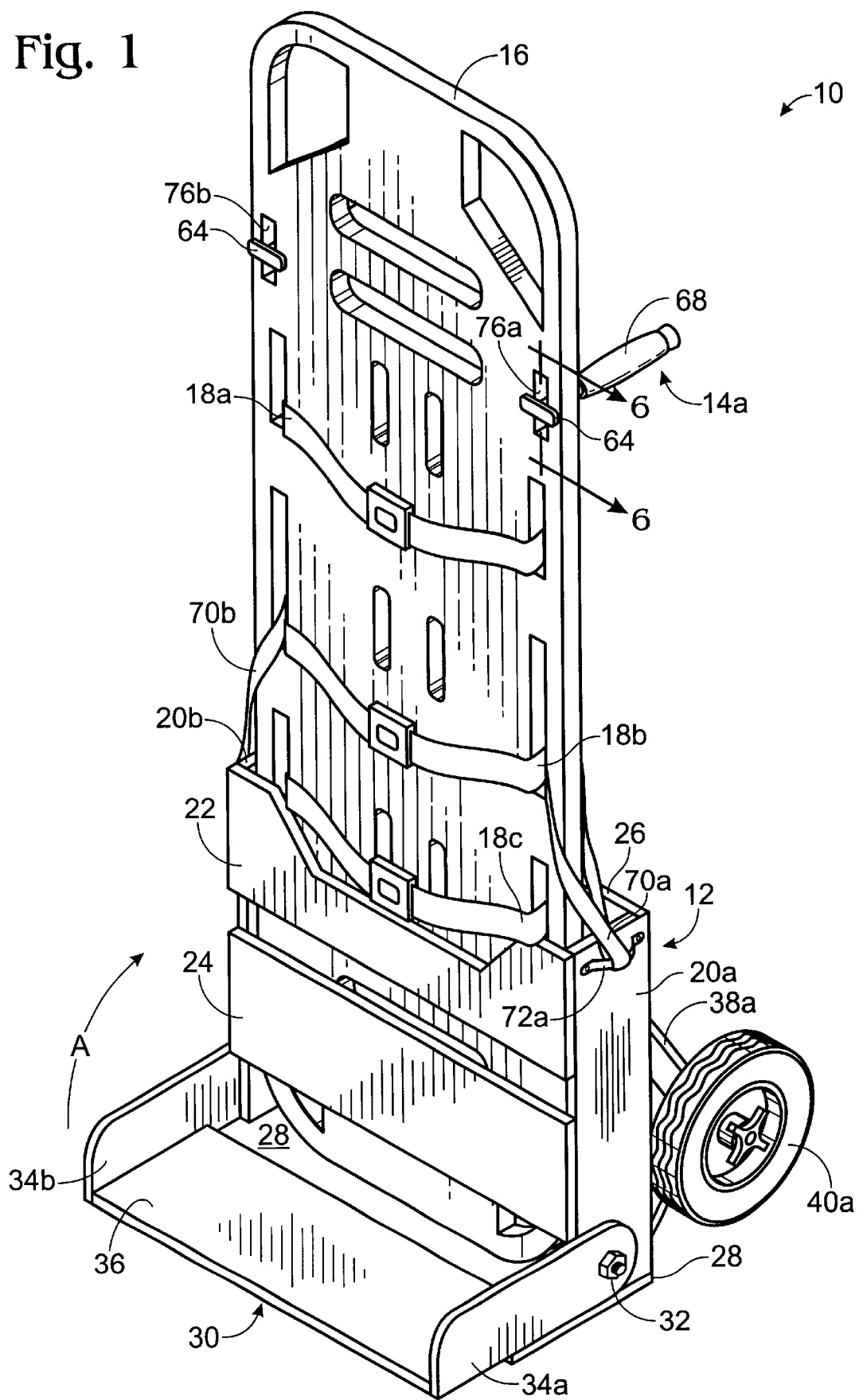
FIG. 1 is a perspective view of a preferred embodiment of the present invention, showing the wheeled dolly box frame, a backboard and one of the optional handles.

With reference to the figures, a preferred embodiment of a patient carrier dolly assembly 10 is shown in FIG. 1. Dolly assembly 10 includes three primary components, box frame 12, handles 14a, 14b (FIGS. 1 and 2), and patient carrier device 16. The box frame 12 and the handles 14 are designed to adapt to most every style of patient carrier device found on the market today, from standard backboards to extrication cots. The particular patient carrier device shown in the drawings is in the form of a typical "backboard." These products are commercially available from many different sources and are available in many different styles. The backboard 16 shown in the figures is a generic representation of a backboard that could be obtained from any number of sources. Most of these devices have certain structural attributes in common. For instance, since they are designed to support a human patient, and often one that is unconscious, the devices are typically planar elongate structures that are sufficiently stiff to support the patient without excessive flexing of the carrier. Patient carriers have a plurality of slots and holes for attaching straps, which are used, for example, to strap the patient to the device, thereby immobilizing the patient to the degree necessary under the conditions. The word "backboard" as used herein should be understood as a generic reference to all such patient carrier devices.

Backboard 16 shown in FIG. 1 includes three patient straps 18a, 18b and 18c. These straps are used to strap the patient on the backboard to thereby immobilize the patient, and they generally are provided with appropriate clasps to secure the free end or ends, as illustrated with the interconnected straps 18 shown in FIG. 1. The lowermost of the three patient straps (18c) is positioned near the patient's knees. This type of a strap is referred to as a "lock-out" strap. If the patient is unconscious, this strap helps prevent the patient's knees from buckling if the patient's head is elevated higher than his or her feet during transport. With the present invention the patient likely will be transported with the backboard at an incline or an oblique angle relative to the ground plane. That is, the patient is transported with the dolly wheels on the ground, and the "upper" end of the backboard being held by the paramedic—much in the fashion of a traditional hand truck. At such an incline the patient's knees naturally might have a tendency to bend or buckle, particularly if the patient is not conscious. The lockout strap 18c thus may be wider than the other straps used with the backboard to provide a secure method of preventing the patient's knees from buckling when at such an incline.

Most all backboards also typically include numerous handhold slots positioned around the periphery of the backboard. Paramedics use these as handholds to grasp the backboard when picking it up.

Figure 4:
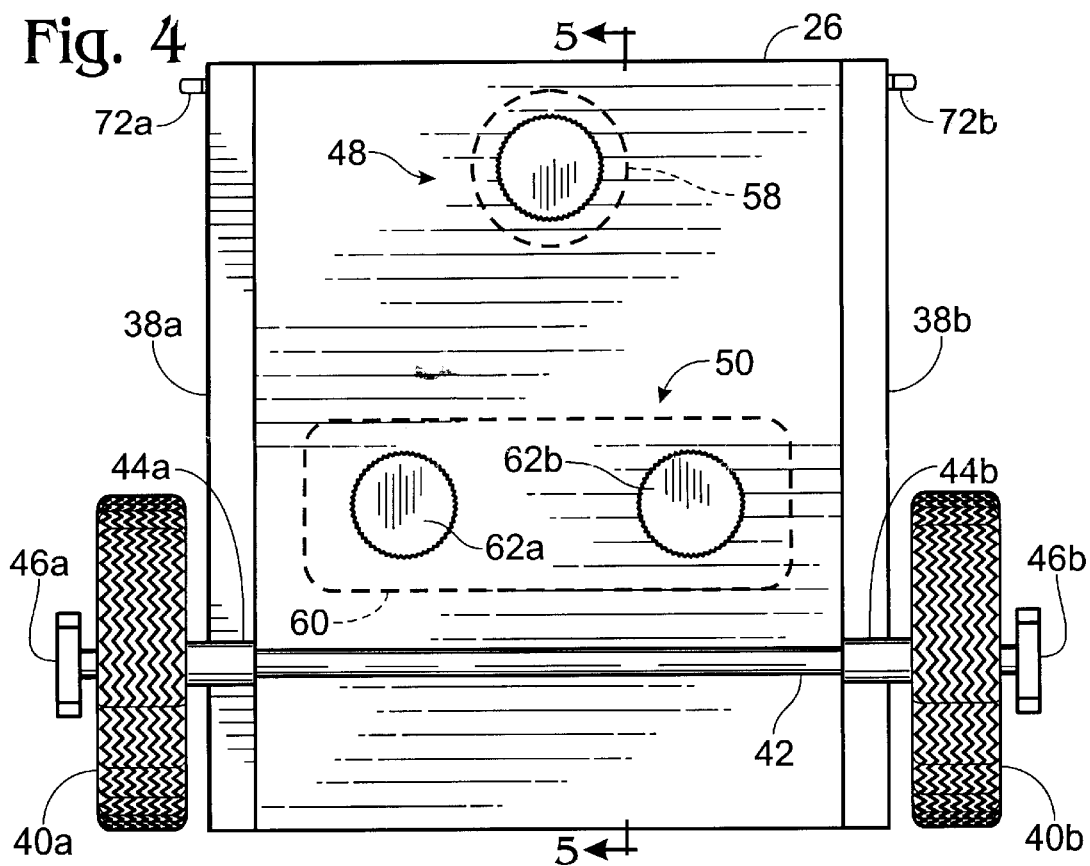
FIG. 4 is a rear elevational view of the box frame of the present invention, showing the pressure pads in phantom lines.
Figure 5:
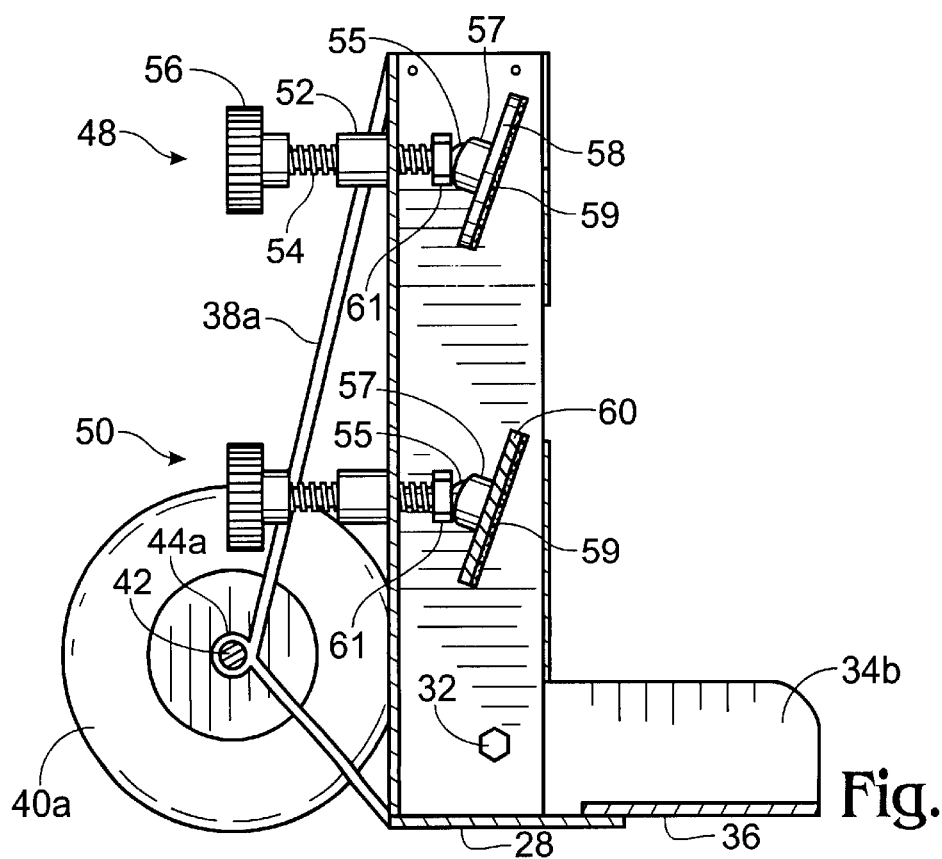
FIG. 5 is a cross sectional view of the box frame taken along the line 5—5 of FIG. 4.

Referring now to box frame 12, the frame is formed of lateral upright frame members 20a and 20b, which are interconnected on the front side by a top front plate 22 and a bottom front plate 24, and at the back side by a rear plate 26 (FIG. 4). A bottom plate 28 interconnects lateral upright frame members 20a, 20b and rear plate 26 at the lower edges thereof and extends in the forward direction beyond the forward edges of the upright frame members 20a and 20b, as shown in FIGS. 1 and 5. Together the lateral frame members 20a and 20b, rear plate 26, top and bottom front plates and the bottom plate define a box frame having an interior compartment that has an opening into it through the top or upper side of the box frame. As detailed below and as illustrated in the drawings, in use the backboard is inserted into the interior compartment of the box frame through the opening and is secured therein.

The box frame is made of any sufficiently strong material, and is preferably fabricated from heavy gauge aluminum.

The bottom plate 28 defines a platform that provides support for a fold-down footrest 30. Footrest 30 is pivotally connected to frame members 20a and 20b with, for example, threaded bolts/nuts 32 (one of which is shown in FIG. 1). Footrest 30 comprises a pair of outer arms 34a and 34b, which are interconnected with a foot plate 36. Footrest 30 may be pivoted about threaded bolts/nuts 32 to move the foot rest between a lowered position (shown in the drawings) in which a patient's feet are able to rest on foot plate 36, and a folded position (not shown) in which foot plate 36 lies adjacent and abuts bottom front plate 24. Foot rest 30 is pivoted into the folded position in the direction of arrow A in FIG. 1. When the foot rest is in the lowered position, bottom plate 28 underlies foot plate 36 to provide support and strength for the foot plate. The dolly assembly may be stored more efficiently with the foot rest in the folded position, although in some patient-carrying situations it may be advantageous to strap the patient to the device with the foot rest in the folded position.

A pair of stair glides 38a and 38b is affixed to rear plate 26. The stair glides are of the usual construction and function in a known manner to ease moving the dolly assembly up or down a flight of stairs.

Referring to FIG. 4, a pair of wheels 40a and 40b are mounted on axle 42 that extends through axle bushings 44a and 44b, which are mounted on stair glides 38a and 38b, respectively. Various types of wheels may be used with the dolly assembly of the present invention, and, as detailed below, the wheels may be quickly removed to allow different types of wheels to be mounted to axle 42, or as detailed below, an alternate axle for use with the alternate wheel. The wheels shown in FIG. 1 are standard heavy-duty wheels. To facilitate quick interchangeability of the different wheels, the outer or distal ends of axle 42 are threaded, and the wheels are mounted on axle 42 with threaded lugs 46a and 46b, which thread onto the axle.

Adjustable pressure plates are provided with box frame 12 to make a secure connection between backboard 16 and the box frame. Specifically, as best illustrated in FIGS. 4 and 5, there is provided a top pressure plate assembly 48 and a bottom pressure plate assembly 50. Top pressure plate assembly 48 includes an internally threaded bushing 52 attached to rear plate 26. A bore through rear plate 26 communicates with the internally threaded bushing to define a passageway through the rear plate and the bushing. A threaded shaft 54 is threaded through bushing 52 such that the shaft extends into the interior compartment defined by the box frame. A knurled knob 56 is attached to the outer end of shaft 54 rearward of rear plate 26 and a pressure plate 58 is attached to the opposite end of shaft 54 in the interior compartment of the box frame. More specifically, the interior distal end of shaft 54 comprises a ball joint 55. Pressure plate 58, which in the preferred embodiment is a circular plate (phantom lines in FIG. 4), includes a socket 57 configured for receiving ball joint 55. The ball and socket connection between shaft 54 and pressure plate 58 allows the pressure plate to "float" on shaft 54. An optional shaft retaining collar 61 may be fixed to shaft 54 adjacent the interior distal end of the shaft as shown in FIG. 5. The retaining collar functions as a keeper that prevents the shaft from being threaded out of bushing 52. The inner surface of pressure plate 58 (that is, the surface of pressure plate 54 that abuts backboard 16 when a backboard is installed in the dolly, FIG. 2) is preferably covered with a non-slip surface 59 such as an adhesive-backed non-slip material.

A second pressure plate 60 is used in bottom pressure plate assembly 50. As shown in the phantom lines in FIG. 4, bottom pressure plate 60 is an elongate plate member that is operated by a pair of independently operable lower pressure plate knobs 62a and 62b, each of which is connected to the pressure plate in a manner identical to that described above with reference to top pressure plate assembly 48. An identical ball 55 and socket 57 assembly is used to connect the pressure plate 60 to the two shafts 54 used in bottom pressure plate 60, allowing the pressure plate to float on the shafts.

Figure 6:
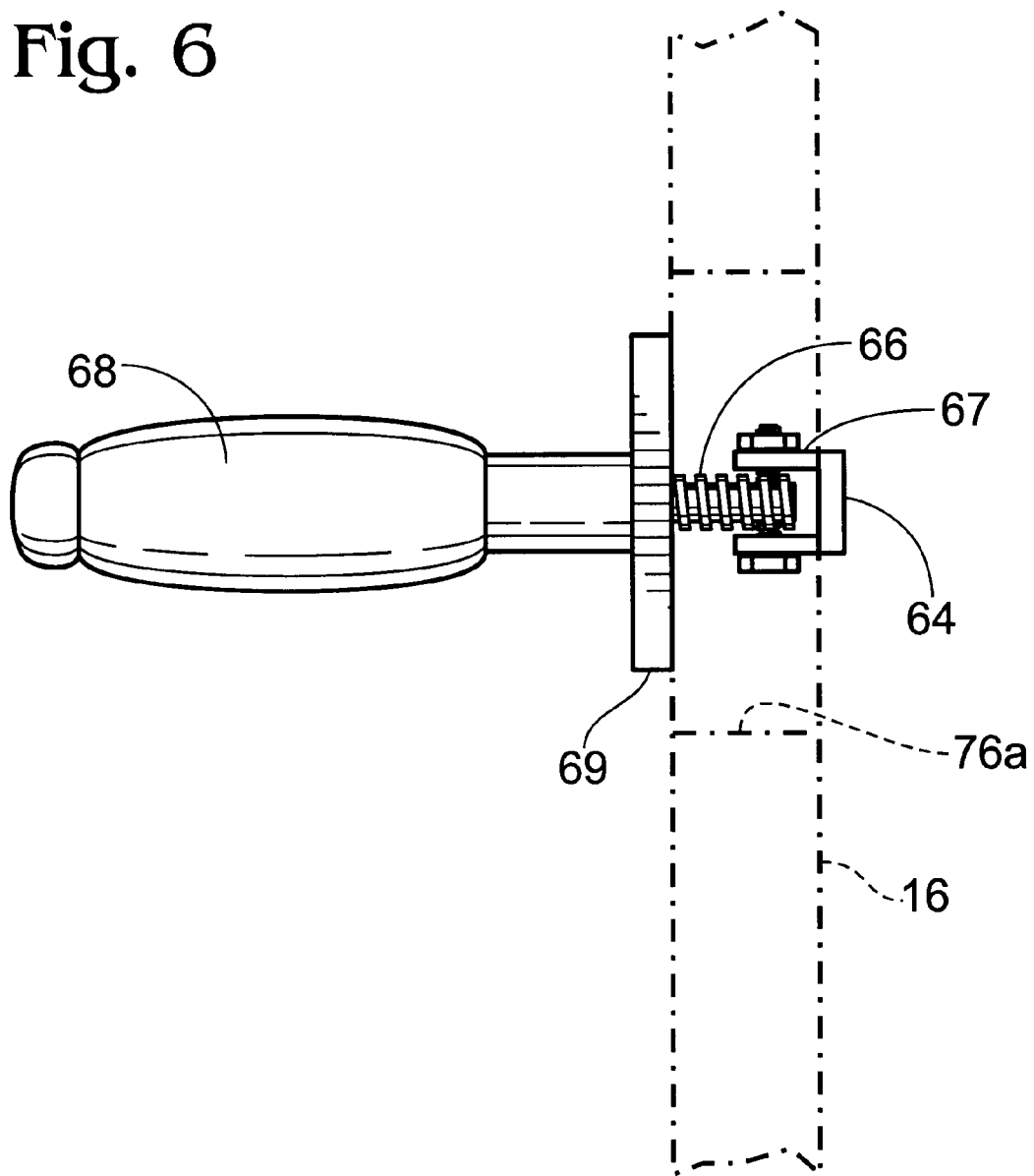
FIG. 6 is a partial cross sectional view taken along the line 6—6 of FIG. 1, showing a detail of the handle assembly.

The handles are shown in detail in FIG. 6. In most instances, two handles are used with the dolly assembly, although the handles may be omitted, or more or less than two may be used in a particular situation. Regardless of whether or how many handles are used, handles 14a and 14b shown in the figures are identical in structure. Each handle 14 includes an elongate toggle bar 64 (FIG. 1) that is pivotally connected to a threaded shaft 66. As shown in FIG. 6, toggle bar 64 includes a bracket 67 on one side of the bar. A hole is bored through the distal end of shaft 66. A pin or bolt extends through holes in bracket 67 (not shown) and through the hole through shaft 66 to connect the shaft to the bracket. The toggle bar pivots on the pin. The opposite end of threaded shaft 66 is threaded into a threaded bore in the handle body 68. A handle pressure plate 69 is positioned at the base of the handle body.

Assembly and Operation

As noted above, the patient carrier dolly assembly of the present invention may be used with most patient carriers on the market. The patient carrier is assembled by first adjusting the pressure plates to define an opening into the space between the inner-facing surfaces of the pressure plates (i.e., the surfaces defined by non-slip coating 59) and the rear-facing walls of top front plate 22 and bottom front plate 24. This is accomplished by rotating knobs 56 and 62a and 62b so that the pressure plates are moved in a rearward direction. Since the dimensions of backboards and other patient carrier devices are not standardized, and in particular because the thickness of such devices may vary from one manufacturer to the next, the ability to adjust the width of the space into which the backboard is inserted is beneficial. This lends to the ability of the present invention to be used with almost any patient carrier.

When the space so-defined by adjustment of knobs 56, 62a and 62b is sufficiently wide that the selected backboard may be inserted into the space, the backboard is inserted into the space through the opening at the top of the box frame until the lowermost edge of the backboard abuts bottom plate 28 (FIG. 1). Each of the knobs 56 and 62a, 62b is then rotated such that the associated pressure plates 58 and 60 are moved inwardly in the "forward" direction, toward the backboard. The knobs are rotated until the pressure plates make contact with the backboard, thereby exerting pressure between the pressure plates and the backboard. The backboard is thus trapped between the pressure plates on the rearward side, and the inner walls of top front plate 22 and bottom front plate 24. The knobs are tightened to trap the backboard securely in the box frame. As noted, a non-slip surface material may be applied to the inner-facing surfaces of the pressure plates. The same material may also be optionally added to the inner-facing walls of the top and bottom front plates. Since each of the pressure plates is connected to the associated knobs with a ball and socket joint, the pressure plates "float" and therefore are suited for use with backboards that may have an uneven surface where the pressure plates abut the backboard. When the backboard is thus assembled, the backboard defines a longitudinal axis along its length dimension. That axis is preferably substantially transverse to the axis defined by axle 42.

As a safety measure to ensure a secure connection between the box frame and the backboard, a strap connected to the backboard may be clipped or otherwise attached to the box frame. For instance, as illustrated in FIG. 1, straps 70a, 70b may be clipped to or threaded through retainer loops 72a, 72b located on outer upright frame members 20a and 20b, respectively. These safety straps are optional.

With the backboard thus assembled with the box frame the footrest 30 may then be moved into the lowered position, as dictated by the particular situation.

If the optional handles are to be used, the handle toggle bars are inserted through appropriately sized elongated slots formed in the backboard, such as slots 76a and 76b shown in FIG. 1. The handles are usually positioned near the upper end (or the patient's head end) of the backboard. However, a handle may be inserted into any slot of an appropriate size and shape to receive the toggle bar. The toggle bar is then rotated approximately 90° relative to the longitudinal axis of the elongate slot such that the longitudinal axis of the toggle bar is transverse to the longitudinal axis of the slot, and such that the outer distal ends of the toggle bar spans the elongate slot and overlap the edges of the slot, as shown in FIG. 1. The handle body may then be rotated on threaded shaft 66 to move handle pressure plate 69 toward backboard 16 until pressure plate 69 bears against one surface of the backboard and the toggle bar bears against the opposite surface of the backboard. Rotation of the handle body is continued until the handle is locked into place by the "pinching" action exerted on the backboard between the toggle bar and the handle pressure plate.

At this point a patient may be secured to the backboard in the usual fashion, except the patient's feet will in most cases be resting upon the platform defined by footrest 30. In most cases the patient will be in a supine position when first strapped to backboard 16. When handles 14a and 14b are used, and when the wheels 40a and 40b shown in FIG. 1 are used, the dolly assembly may be laid down such that the backboard forms a horizontal platform that rests on the two wheels, and the two handles such that the platform is substantially parallel to the ground plane. The patient may then be lifted by raising the "upper" or "head" end of the backboard, either by grasping the handles or by using other slots in the backboard as handholds.

Since the dolly assembly utilizes wheels, the patient may be maneuvered out of difficult locations quickly and easily, and with fewer paramedics than would otherwise be required. This is true even for very heavy patients that otherwise might present severe difficulties for the paramedics.

In some instances it is preferable to use an off-road type of wheel. This is accomplished by removing wheels 40a and 40b by removing lugs 46a and 46b, respectively. With an off-road type of wheel a new axle must be inserted through the axle bushings. Thus, axle 42 is removed and the new, longer axle is inserted through the bushings. As illustrated in FIG. 3, an off-road a wheel may be quickly mounted to the axle. The bicycle-type off road wheel 74 shown in FIG. 3 is typically used in an "over the side" situation where a patient is located, for instance, over a cliff or an embankment. The use of a larger diameter wheel, like wheel 74, allows the patient to be extricated from such a situation with fewer paramedics since a pulley and sling system can easily be rigged to pull the dolly assembly up an embankment with as few as two paramedics supporting the head end of the apparatus. Off-road wheel 74 is sufficiently strong to meet the demands placed on it, and preferably includes a pneumatic tire.

The backboard is quickly disassembled from the box frame. This may be done when the patient is loaded into a transport vehicle, or at any other appropriate time. The backboard is released by turning the knobs of pressure plate assemblies 58 and 60 to release the pressure between the pressure plates and the backboard. The handles may also be quickly removed in a like manner.

Those skilled in the art will appreciate that various alternate equivalent structures may be used in place of some of the structural features described above. For instance, the threaded shafts of the pressure plate assemblies may be replaced with cams, which perform the equivalent function—that is, to exert pressure between the pressure plate and the backboard to lock backboard in place in the box frame. A similar cam mechanism may be used with the optional handles. As a further example of an equivalent mechanism for making a secure connection between the backboard and the box frame, a spring-loaded detent may be positioned to engage a slot formed in the backboard. Further, while the preferred embodiment of the box frame is an enclosed structure defining an interior compartment (for receiving and holding the backboard) and having an opening thereto through the upper side, the front and rear plates may be manufactured such that the frame assembly is not fully enclosed. For example, the top and bottom front plates (22, 24) could be manufactured such that they do not extend all of the way between the upright frame members 20a and 20b.

Use of the present invention greatly simplifies patient transport from difficult locations and greatly reduces the risk of injury to emergency medical personnel. While the invention has been described in terms of a preferred embodiment and certain alternatives, it will be appreciated by one of ordinary skill that the spirit and scope of the invention is not limited to those embodiments, but extend to the various modifications and equivalents as defined in the appended claims.

What is claimed is:

1. A patient carrier dolly comprising:
   a patient carrier;
   a patient carrier frame comprising
      (a) lateral opposite wall members;
      (b) front and rear wall members interconnecting said lateral wall members to define a patient carrier receiving space;
      (c) at least one adjustable pressure inducing member in said space;
      (d) a pair of wheels attached to said frame; and
   wherein the at least one pressure inducing member further comprises a shaft threaded through said rear wall member and having a first distal end disposed within said space between said rear wall member and said front wall member, an opposite end of said shaft disposed outside of said space, a pressure pad connected to said first end, said shaft defining a longitudinal axis whereby rotation of said shaft in a first direction about the longitudinal axis moves said pressure pad toward said front wall member and rotation of said shaft in the opposite direction moves said pressure pad toward said rear wall member.

2. The patient carrier dolly of claim 1 wherein said pressure pad is operable to contact said patient carrier when said patient carrier is received in said space and said shaft is rotated in said first direction, thereby exerting pressure on said patient carrier and securing said patient carrier in said space between said pressure pad and said front wall member.

3. The patient carrier dolly of claim 1 including a second pressure inducing member in said space, said second pressure inducing member comprising independently operable first and second spaced apart shafts threaded through said rear wall member, each shaft having a first distal end disposed within said space between said front and said rear wall members, an opposite end of each shaft disposed outside of said space, the first end of each shaft connected to a common pressure pad, and each shaft defining a longitudinal axis whereby rotation of said shaft in a first direction about the longitudinal axis moves said pressure pad toward said front wall member and rotation of said shaft in the opposite direction moves said pressure pad toward said rear wall member.

4. The patient carrier dolly of claim 3 wherein said common pressure pad is operable to contact said patient carrier when said patient carrier is received in said space and said first and second shafts are rotated in said first direction, thereby exerting pressure on said patient carrier and securing said patient carrier in said space between said pressure pad and said front wall member.

5. The patient carrier dolly of claim 1 wherein said wheels are removable and interchangeable with wheels having a different diameter.

6. The patient carrier dolly of claim 1 further including a safety strap interconnecting said patient carrier to said frame.

7. The patient carrier dolly of claim 1 further including at least one handle removably connected to said patient carrier.

8. The patient carrier dolly of claim 7 wherein said handle comprises a handle body having a threaded axial bore formed therein, a shaft threaded into said bore and having a first end outside of said handle body, a longitudinal toggle connected to said first end of said shaft, and a pressure plate between said handle body and said toggle.

9. The patient carrier dolly of claim 1 further including a patient footrest pivotally connected to said frame, said footrest including a plate member configured for supporting the feet of a patient strapped to said patient carrier.

10. The patient carrier dolly of claim 9 wherein said footrest is movable between a first position where said plate member defines a platform for supporting the feet of a patient strapped to said patient carrier and a second position wherein said plate member abuts said front wall member.

11. A frame assembly for use in patient transport, comprising:

(a) lateral opposite wall members;

(b) front and rear wall members interconnecting said lateral wall members to define a backboard receiving space between said lateral opposite wall members and said front and rear wall members;

(c) backboard securing means for securing said backboard in said backboard receiving space to prevent relative movement therebetween when a backboard is received in said backboard receiving space; and (d) a pair of wheels; and wherein said backboard securing means comprises a shaft threaded through said rear wall member, a pressure pad connected to a first end of said shaft in said backboard receiving space, whereby rotation of said shaft in a first direction moves said pressure pad toward said front wall member and rotation of said shaft in the opposite direction moves said pressure pad toward said rear wall member.

12. The frame of claim 11 wherein said backboard securing means comprises pressure inducing means for exerting pressure against said backboard to confine said backboard in said backboard receiving space.

13. The frame of claim 12 wherein said backboard securing means further comprises separately operable second and third spaced apart shafts threaded through said rear wall members, a common pressure pad attached to a first end of each of said second and third shafts in said backboard receiving space.

14. The frame of claim 13 wherein rotation of said second or third shafts in a first direction moves said common pressure pad toward said front wall member and rotation of said second or third shafts in the opposite direction moves said common pressure pad toward said rear wall member.

15. The frame of claim 11 including a backboard secured in said backboard receiving space and at least one handle removably connected to said backboard, said handle comprising a handle body having a threaded axial bore formed therein, a shaft threaded into said bore, a toggle connected to a first end of said shaft, and a pressure plate between said handle body and said toggle.

16. A method of transporting an injured patient on a backboard, comprising the steps of:

(a) providing a backboard that defines a patient-carrying platform;

(b) providing a backboard frame assembly comprising a pair of lateral opposite frame members interconnected by front and rear frame members to define a backboard receiving space, a pair of wheels, and at least one adjustable pressure pad in said receiving space;

(c) adjusting said pressure pad to size the receiving space sufficiently to receive said backboard;

(d) inserting said backboard into said receiving space (e) adjusting said pressure pad such that said pressure pad exerts pressure on said backboard to prevent relative movement between said backboard and said backboard frame;

(f) strapping said patient to said backboard.

17. The method of claim 16 including the step of connecting to said backboard at least one handle.

18. The method of claim 17 wherein the method includes the step of transporting said patient on said backboard such that said patient-carrying platform is inclined at an oblique angle relative to the ground plane.

* * * * *